G. CONKLIN.
Grapple.

No. 162,801.

Patented May 4, 1875.

WITNESSES:
A Bennemendorf
A. F. Terry

INVENTOR:
Geo. Conklin
BY
ATTORNEYS.

UNITED STATES PATENT OFFICE.

GEORGE CONKLIN, OF POUGHKEEPSIE, NEW YORK.

IMPROVEMENT IN GRAPPLES.

Specification forming part of Letters Patent No. 162,801, dated May 4, 1875; application filed March 29, 1875.

*To all whom it may concern:*

Be it known that I, GEORGE CONKLIN, of Poughkeepsie, Dutchess county, New York, have invented a new and Improved Grapple, of which the following is a specification:

The invention will first be fully described, and then pointed out in the claim.

Figure 1:
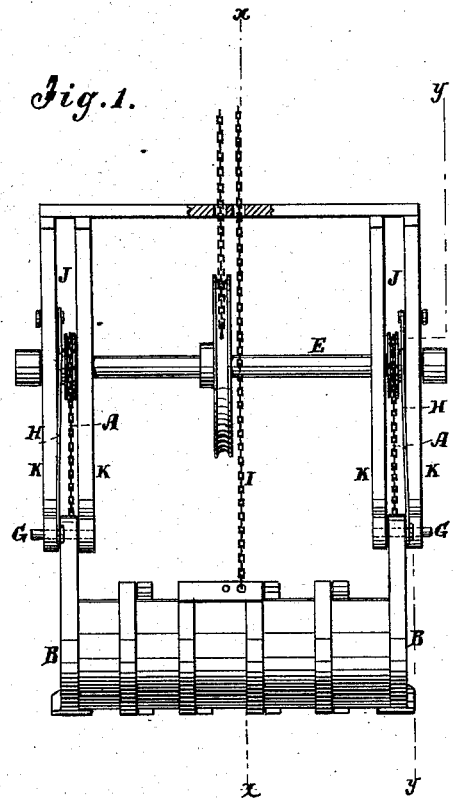
Figure 2:
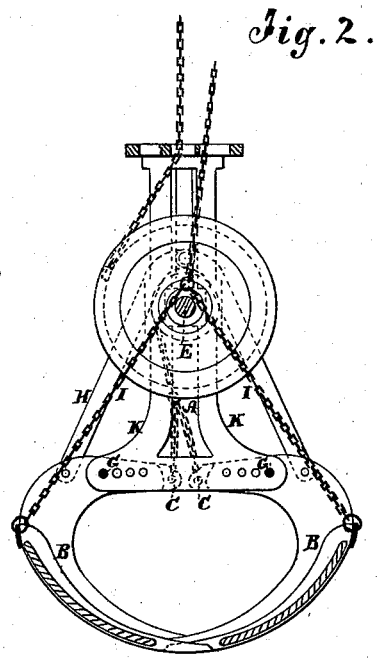
Figure 3:
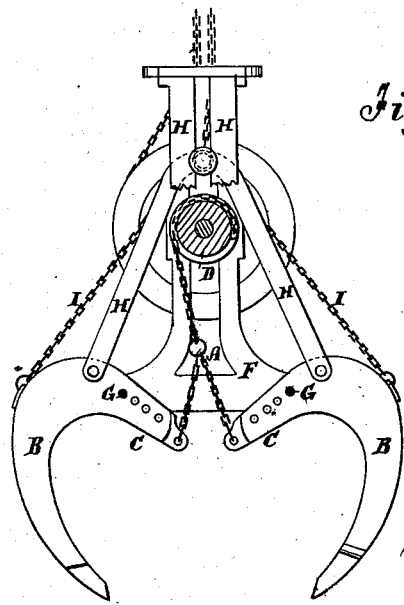

Figure 1 is a side elevation of my improved grapple. Fig. 2 is a sectional elevation of Fig. 1 on the line $x\,x$, and Fig. 3 is a section on the line $y\,y$.

Similar letters of reference indicate corresponding parts.

A represents the chains for closing the jaws. They are connected to the ends of arms C, and extend directly to and wind on the pulleys D of the shaft E, which is used to close the jaws, the jaws being pivoted to the frames F at G, to afford the requisite leverage to the arms. The guide-rods H are connected outside of the pivots, and serve only to regulate the opening and closing of the jaws. The opening and suspending chains I are connected in the usual way. The frames K are double, and have a space, J, between them, in which the jaws are pivoted, and the closing chains and pulleys for operating them are arranged, making a neat appearance, and forming a more substantial construction.

The arms have a series of pivot-holes arranged in a line to vary the leverage.

Having thus described my invention, I claim as new and desire to secure by Letters Patent—

The combination of lever-jaws B B, pivoted at G G to a double frame, F K, provided with end chains A, and having pulleys D D, arranged as and for the purpose specified.

GEO. CONKLIN.

Witnesses:
 A. P. THAYER,
 ALEX. F. ROBERTS.